(12) United States Patent
Tsuji

(10) Patent No.: US 7,297,088 B2
(45) Date of Patent: Nov. 20, 2007

(54) ELECTRONIC PEDOMETER

(75) Inventor: Tomoharu Tsuji, Chiba (JP)

(73) Assignee: Seiko Instruments Inc. (JP)

( * ) Notice: Subject to any disclaimer, the term of this patent is extended or adjusted under 35 U.S.C. 154(b) by 194 days.

(21) Appl. No.: 11/109,045

(22) Filed: Apr. 19, 2005

(65) Prior Publication Data

US 2005/0238132 A1    Oct. 27, 2005

(30) Foreign Application Priority Data

Apr. 20, 2004    (JP) .............................. 2004-124641

(51) Int. Cl.
*A63B 21/00*    (2006.01)
*A63B 22/00*    (2006.01)

(52) U.S. Cl. .............................. 482/3; 482/8; 482/900; 377/24.2; 702/160

(58) Field of Classification Search ................ 482/1–9, 482/54, 900–902; 235/105; 342/357.06; 36/132, 136; 377/24, 24.2; 702/160
See application file for complete search history.

(56) References Cited

U.S. PATENT DOCUMENTS 4,855,942 A * 8/1989 Bianco ........................ 702/160

6,254,513 B1 * 7/2001 Takenaka et al. .............. 482/3

FOREIGN PATENT DOCUMENTS

| JP | 56086309 | 7/1981 |
|----|----------|--------|
| JP | 63262784 | 10/1988 |
| JP | 2697911  | 9/1997 |
| JP | 3017529  | 12/1999 |

* cited by examiner

*Primary Examiner*—Glenn E. Richman
(74) *Attorney, Agent, or Firm*—Adams & Wilks

(57) ABSTRACT

To enhance precision in measurement of the number of steps even when a walk cycle changes. An acceleration detecting portion outputs a walk signal corresponding to a walk of a user detected by a walk sensor. A step number counting portion of a counting portion counts each signal which is judged to be beyond a first reference cycle range by a walk cycle comparing portion among signals from the acceleration detecting portion as the number of steps for one step, and when an extra-regulation step number processing portion judges that a predetermined number of signals each within a second reference cycle range among the signals each beyond the first reference cycle range is continuously outputted, counts the predetermined number of signals as the predetermined number of steps.

18 Claims, 3 Drawing Sheets

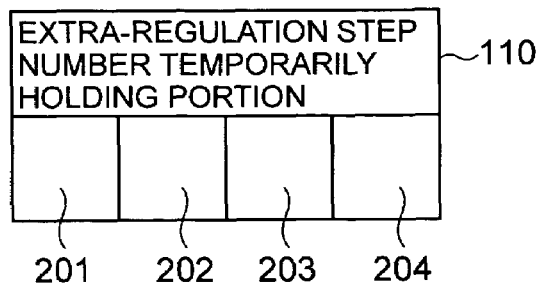
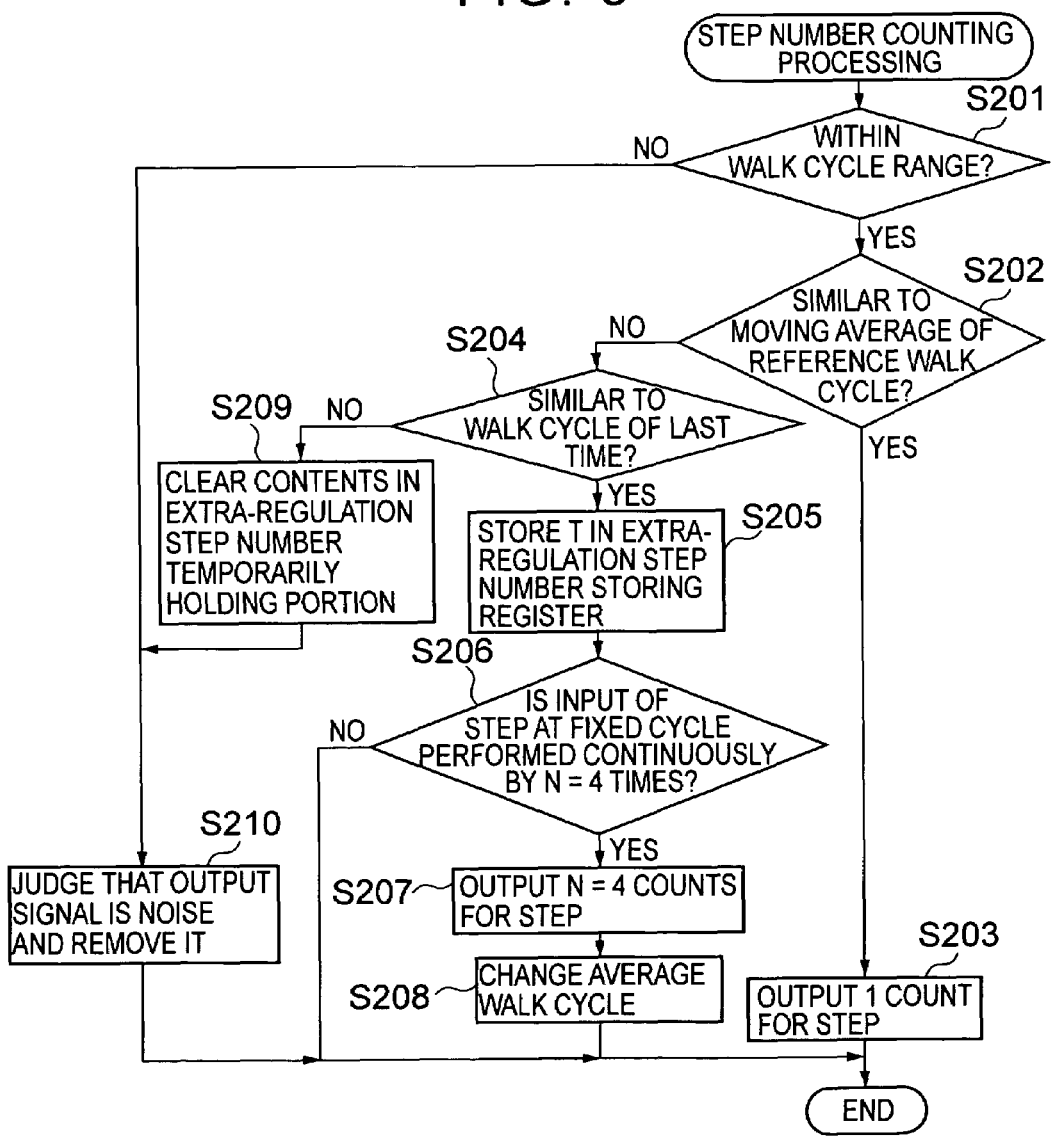

ELECTRONIC PEDOMETER

BACKGROUND OF THE INVENTION

1. Field of the Invention

The present invention relates to an electronic pedometer which is used by being mounted on a human body in order to electronically count the number of steps by a person having the electronic pedometer mounted thereon.

2. Description of the Prior Art

Heretofore, an electronic pedometer has been developed which is used by being mounted on a human body in order to count the number of steps by a user through an electronic processing.

In general, for counting of the number of steps, an acceleration caused by vertical movement of a user's body during walking is detected to count how many times the accelerations occur as the number of steps.

However, a problem arises in that various noises due to motions of daily life other than a walk are detected, and hence the number of steps cannot be precisely measured as has been pointed out formerly.

In order to solve this problem, there have been proposed a method in which after an acceleration is detected once, a predetermined dead zone time period is set to avoid misdetection due to noises (refer to Patent Document 1 for example), a method in which detection signals are counted as the number of steps only when it is detected that the detection signs are continuously outputted by the predetermined number of times (refer to Patent Document 2 and Patent Document 3 for example), and the like.

However, the acceleration is not only caused by a walk, but also caused by motions in daily life. Thus, it is impossible to distinguish the acceleration by a walk from the acceleration (caused by an office work for example) which regularly continues to enter the walk.

In order to improve this problem, a method is proposed in which a cycle in a walk is detected, and the number of steps is calculated from the cycle and a walk time period (refer to Patent Document 4 for example).

However, even if such measures are taken, a walk cycle is not usually maintained in a fixed state. A pace may be changed or a detection signal may be mixed with a noise. Hence, it is actually difficult in many cases to detect precisely a cycle.

FIG. 4 is a block diagram of a pedometer described in Patent Document 1 described above. The pedometer includes: an acceleration detecting portion 301, which is used by being mounted on the body of a user, for detecting an acceleration caused by a walk of the user to output a signal (walk signal) corresponding to the walk; a filter portion 302 for outputting a signal having a predetermined cycle corresponding to a walk cycle from the output signal from the acceleration detecting portion 301; a walk cycle calculating portion 306 for calculating a walk cycle as a reference by averaging a predetermined number of signals of the signals outputted from the filter portion 302; a walk cycle comparing portion 303 for comparing a cycle of each signal outputted from the filter portion 302 with the walk cycle as the reference calculated in the walk cycle calculating portion 306 to output a signal having a cycle similar to the walk cycle as the above reference of the signals outputted from the filter portion 302; a step number counting portion 304 for counting signals from the walk cycle comparing portion 303; and a display portion 305 for displaying thereon a count value obtained through the counting in the step number counting portion 304. It should be noted that the filter portion 302, the walk cycle comparing portion 303, the step number counting portion 304, and the walk cycle calculating portion 306 can be configured with a central processing unit (CPU), and a storage portion for storing therein a program to be executed by the CPU.

The acceleration detecting portion 301 detects an acceleration caused by a walk of a walker to output a signal corresponding to the walk. The filter portion 302 outputs a signal having a predetermined cycle corresponding to a walk cycle from the output signal of the acceleration detecting portion 301. The walk cycle calculating portion 306 calculates a walk cycle as a reference by averaging a predetermined number of signals of the signals outputted from the filter portion 302. The walk cycle comparing portion 303 compares a cycle of each signal outputted from the filter portion 302 with the walk cycle as the reference calculated in the walk cycle calculating portion 306 to output a signal having a cycle similar to the walk cycle as the above reference of the signals outputted from the filter portion 302. The step number counting portion 304 counts signals from the walk cycle comparing portion 303 as signals corresponding to the walk. The display portion 305 displays thereon data on the number of steps as a count value obtained through the counting in the step number counting portion 304.

In such a manner, the electric pedometer is configured such that the walk cycle comparing portion 303 outputs the signals which are generated with a cycle similar to the walk cycle as the reference. Thus, a predetermined dead zone is provided so as not to detect any of the signals which are generated for time periods other than the time period similar to the time period having the walk cycle. As a result, it becomes possible to avoid that the noise is detected as the signal caused by the walk by mistake.

However, a walk cycle is not usually maintained in a fixed state. A pace may be changed or a detection signal may be mixed with a noise. Hence, it is actually difficult in many cases to detect precisely a cycle. Moreover, even if a dead zone time period is provided, precision in measurement of the number of steps is low. This is a problem.

<patent document 1> JP laid-open disclosure public patent bulletin 56-86309

<patent document 2> JP laid-open disclosure public patent bulletin 63-262784

<patent document 3> JP patent number 3017529

<patent document 4> JP patent number 2697911

It is an object of the present invention to enhance precision in measurement of the number of steps even when a walk cycle changes.

SUMMARY OF THE INVENTION

According to the present invention, there is provided an electronic pedometer having: walk detecting means, having a walk sensor, for outputting a walk signal corresponding to a walk of a user detected by the walk sensor; and counting means for counting the number of steps based on the walk signal from the walk detecting means, the walk sensor being used at least by being mounted on a body of the user, in which the counting means counts each signal within a first reference cycle range of signals from the walk detecting means as the number of steps for one step, and when a predetermined number of signals each within a second reference cycle range of the signals each beyond the first reference cycle range are continuously outputted from the walk detecting means, the counting means counts the predetermined number of signals as a predetermined number of steps.

The counting means counts each signal within a first reference cycle range of signals from the walk detecting means as the number of steps for one step, and when a predetermined number of signals each within a second reference cycle range of signals each beyond the first reference cycle range are continuously outputted from the walk detecting means, the counting means counts the predetermined number of steps as the predetermined number of steps.

Here, the counting means may include: first cycle judging means for judging whether or not each signal from the walk detecting means is a signal within the first reference cycle range; second cycle judging means for judging whether or not each signal judged to be beyond the first reference cycle by the first cycle judging means among the signals from the walk detecting means is a signal within the second reference cycle range; and step number counting means for counting each signal judged to be a signal within the first reference cycle range by the first reference cycle judging means among the signals from the walk detecting means as the number of steps for one step, and for, when the second reference cycle judging means judges that a predetermined number of signals each within the second reference cycle range are continuously outputted from the walk detecting means, counting the predetermined number of signals thus continuously outputted as the predetermined number of steps.

In addition, the second cycle judging means may include first cycle storing means for successively storing data on cycles of the predetermined number of signals each judged to be a signal within the second reference cycle range, and when the signal judged to be beyond the first reference cycle range by the first cycle judging means is a signal within a predetermined cycle range with a cycle of a newest signal data on which is stored in the first cycle storing means as a reference, judge that the signal thus judged is a signal within the second reference cycle range and stores the signal thus judged in the first cycle storing means. The first cycle storing means may be configured such that when storing therein data on the cycles of the predetermined number of signals, the predetermined number of signals are outputted as the predetermined number of steps. The counting means may count the predetermined number of steps.

In addition, the counting means includes reference cycle calculating means for movement-averaging cycles of a predetermined number of signals from the walk detecting means; and the first cycle judging means judges whether or not a signal from the walk detecting means is a signal within the first reference cycle range using as the first reference cycle range a predetermined range having as a reference the moving average calculated by the reference cycle calculating means.

In addition, the reference cycle calculating means may include second cycle storing means for successively storing therein data on cycles of a predetermined number of newest signals each judged to be within the first reference cycle range by the first cycle judging means, and obtain a moving average of the cycles of the predetermined number of signals the data on which is stored in the second cycle storing means.

In addition, the reference cycle calculating means may be configured such that when receiving data on the cycles of the predetermined number of signals from the first cycle storing means, the reference cycle calculating means stores the data on the cycles of the predetermined number of signals in the second cycle storing means, and obtains a moving average using the cycles of the signals the data on which is stored in the second cycle storing means.

In addition, the walk sensor may be used by being mounted on an arm of a user.

In addition, an electronic pedometer may be configured to have a timing function.

BRIEF DESCRIPTION OF THE DRAWINGS

A preferred form of the present invention is illustrated in the accompanying drawings in which:

FIG. 2 is a diagram showing the details of an extra-regulation step number holding portion used in the embodiment mode of the present invention;

FIG. 3 is a flow chart for explaining processings in the embodiment mode of the present invention.

DETAILED DESCRIPTION OF THE PREFERRED EMBODIMENTS

An electronic pedometer according to an embodiment mode of the present invention will hereinafter be described with reference to the drawings.

Figure 1:
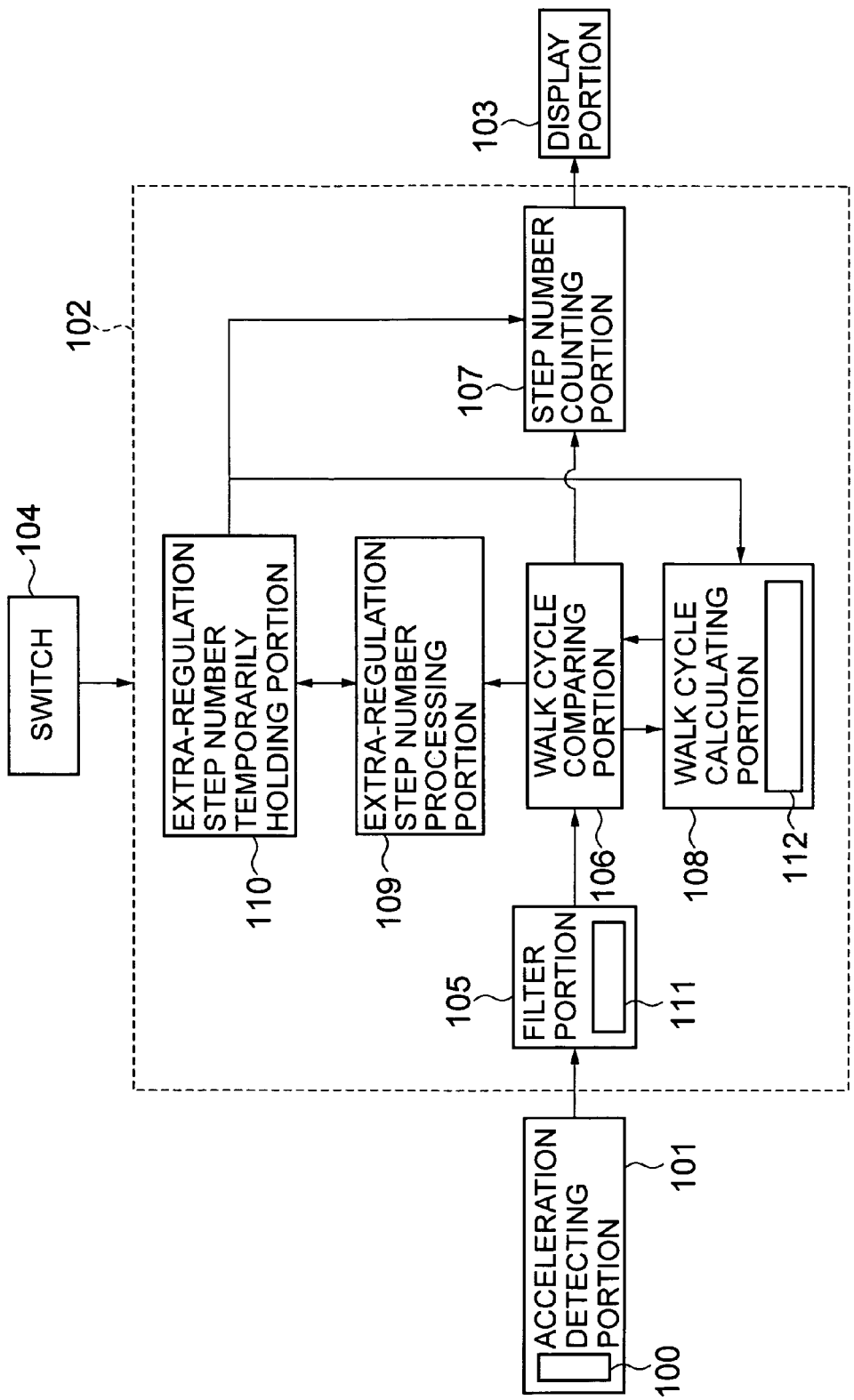
FIG. 1 is a block diagram of an electronic pedometer according to an embodiment mode of the present invention.

FIG. 1 is a block diagram of an electronic pedometer according to an embodiment mode of the present invention.

In FIG. 1, the electronic pedometer includes: an acceleration detecting portion 101 which has a walk sensor 100 constituted by an acceleration sensor and which serves to detect a walk (including running) of a user by the walk sensor 100 to output a signal (walk signal) corresponding to the walk; a counting portion 102 for counting the number of steps of the user based on the walk signal from the acceleration detecting portion 101; a display portion 103 which is constituted by a liquid crystal display device and which serves to display thereon data on the number of steps of the user counted by the counting portion 102; and a switch 104 as manipulation means for carrying out manipulations such as a counting start manipulation and a counting end manipulation for the counting portion 102, and a manipulation for resetting the count value.

The counting portion 102 may be constructed of a central processing unit (CPU) and a storage portion for storing therein a program to be executed by the CPU.

FIG. 1 shows a functional block diagram in which the counting portion 102 is functionally illustrated. The counting portion 102 includes: a filter portion 105 for outputting a signal having a cycle within an allowable change range among signals outputted from the acceleration detecting portion 101; a walk cycle calculating portion 108 for calculating a reference walk cycle by obtaining a moving average Ta of cycles of a predetermined number of newest signals (four signals in this embodiment mode) among signals each of which is judged to be a walk signal in a walk cycle comparing portion 106; the walk cycle comparing portion 106 for comparing a cycle of a signal from the filter portion 105 with a first reference cycle range (Ta ±10% in this embodiment mode) based on the reference walk cycle to output a signal having a cycle within the first reference cycle range among signals outputted from the filter portion 105 as the number of steps for one step to a step number counting portion 107 and to output a signal beyond the first reference cycle range among signals from the filter portion 105 to an extra-regulation step number processing portion 109; the extra-regulation step number processing portion 109 for comparing a cycle of a signal from the walk cycle comparing portion 106 with a second reference cycle range (a cycle of the newest signal among the cycles of the signals data on which is stored in an extra-regulation step number temporarily holding portion 110 in this embodiment mode) to store a signal having a cycle within the second reference cycle range among the signals from the walk cycle comparing portion 106, and for, when the number of cycles of signals data on which is stored in the extra-regulation step number temporarily holding portion 110 becomes a predetermined number (four in this embodiment mode), outputting the data of the number of cycles of signals stored in the extra-regulation step number temporarily holding portion 110 to the step number counting portion 107 and resetting and erasing the data stored in the extra-regulation step number temporarily holding portion 110; and a step number counting portion 107 for counting the current number of steps by adding the numbers of steps obtained from the walk cycle comparing portion 106 and the extra-regulation step number processing portion 109 to a step number count value.

The extra-regulation step number temporarily holding portion 110, as shown in FIG. 2, has a predetermined number (four in this embodiment mode) of storage areas 201 to 204. The extra-regulation step number temporarily holding portion 110 is configured so as to successively store data on cycles of signals from the extra-regulation step number processing portion 109 in the storage areas 201 to 204. The extra-regulation step number temporarily holding portion 110 is a shift register having an FIFO configuration. Data on a cycle of the newest signal is stored in the storage area 201, . . . , data on a cycle of the oldest signal is stored in the storage area 204. Thus, at the same time when data on a cycle of a new signal is stored in the storage area 201, data on cycles of signals stored in the storage areas 201, 202, and 203, respectively, are successively shifted, and the data on the cycle of the oldest signal stored in the storage area 204 is discharged to be erased.

The walk cycle calculating portion 108 has storage means 112 in its inside. The storage means 112 has areas, in which data on cycles of a predetermined number (four in this embodiment mode) of signals is to be stored, similarly to the extra-regulation step number temporarily holding portion 110. The walk cycle calculating portion 108 successively stores data on cycles of a predetermined number of newest signals of signals each of which is judged to be a walk signal by the walk cycle comparing portion in the storage means 112, and calculates the reference walk cycle by obtaining a moving average Ta of the cycles of the predetermined number of signals to output data on the reference walk cycle to the walk cycle comparing portion 106. Note that while, in this embodiment mode, a storage capacity of the extra-regulation step number temporarily holding portion 110 and a storage capacity of the storage means 112 are made identical to each other, those storage capacities are not necessarily made identical to each other.

In addition, when the walk cycle calculating portion 108 receives data on the cycles of the predetermined number of signals stored in the extra-regulation step number temporarily holding portion 110 from the extra-regulation step number temporarily holding portion 110, the walk cycle calculating portion 108 rewrites the storage contents within the storage means 112 to the data on the cycle of the predetermined number of signals received from the extra-regulation step number temporarily holding portion 110, and calculates the moving average Ta using the data on the cycle of the predetermined number of signals obtained through the rewriting to output the resultant moving average Ta to the walk cycle comparing portion 106. Hereinafter, the walk cycle calculating portion 108 successively stores data on cycles of signals from the walk cycle comparing portion 106 in the storage means 112, and calculates the moving average Ta using data on the cycles of the predetermined number of signals thus stored to output the resultant moving average Ta to the walk cycle comparing portion 106.

The filter portion 105 has an allowable cycle range storing means 111 for storing therein data on an allowable cycle range. Data on an allowable range for a cycle with which a signal from the acceleration detecting portion 101 is recognized as a walk signal, i.e., data on a fluctuation range (allowable cycle range) for a cycle when a user normally walks is stored in the allowable cycle range storing means 111 in advance. In this embodiment mode, the allowable cycle range is set in a range of 333 msec (180 rpm) to 1,000 msec. The setting of the allowable cycle range in the allowable cycle range storing means 111 is carried out by manipulating the switch 104.

In addition, while not illustrated, the counting portion 102 has a timing function, and carries out the switching and display of data on the number of steps and time through the manipulation of the switch 104.

It should be noted that the acceleration detecting portion 101, the counting portion 102, the display portion 103, the switch 104, the walk cycle comparing portion 106, the step number counting portion 107, the work cycle calculating portion 108, processing portion 109, the extra-regulation step number temporarily holding portion 110, and the storage means 112 constitute walk detecting means, counting means, display means, manipulation means, first cycle judging means, step number counting means, reference cycle calculating means, second cycle judging means, first cycle storing means, and second cycle storing means, respectively.

FIG. 3 is a flow chart showing processings executed in the counting portion 102.

Figure 4:
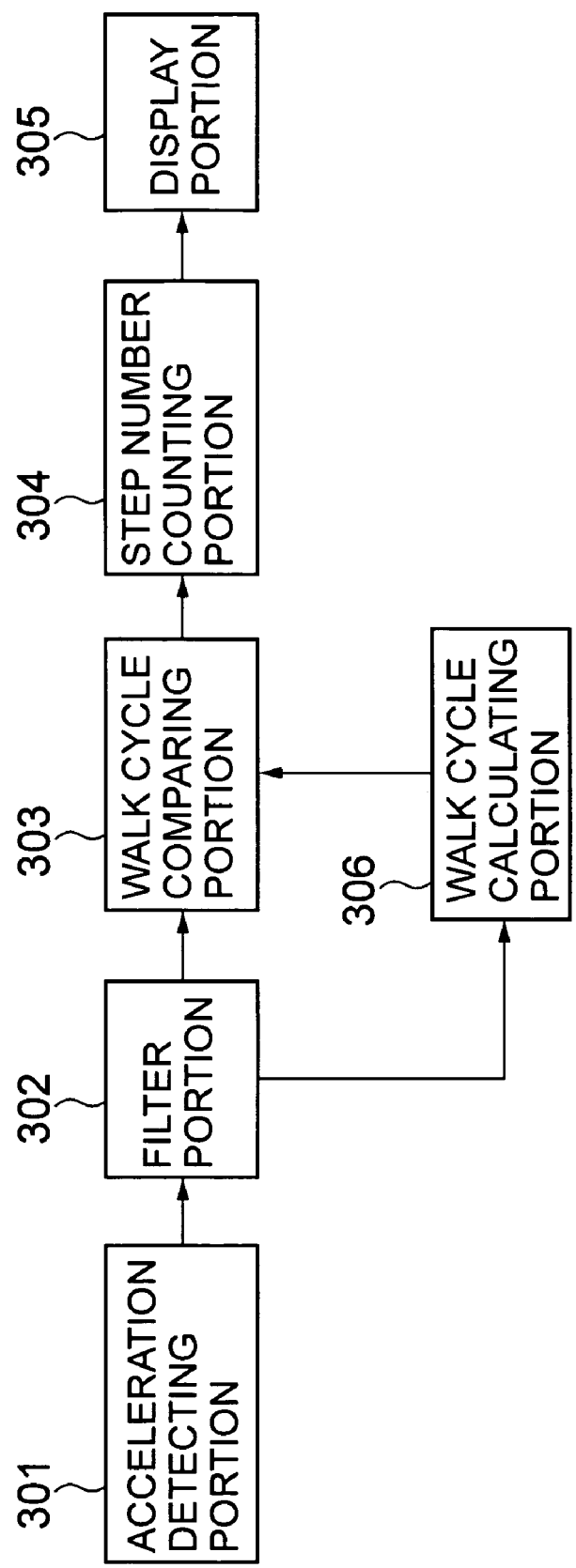
FIG. 4 is a block diagram of a conventional electronic pedometer.

An operation of the electronic pedometer according to this embodiment mode will hereinafter be described with reference to FIGS. 1 to 3, and with reference to FIG. 4 as may be necessary.

First of all, a user wears the electronic pedometer on his/her body as preparation for measurement of the number of steps. At this time, the acceleration sensor provided in the acceleration detecting portion 101 is mounted on an arm of the user. In this state, the user causes the electronic pedometer to start an operation for measuring the number of steps by manipulating the switch 104, and starts to walk.

The acceleration detecting portion 101 detects a walk (including running) of the user to output a signal (walk signal) corresponding to the walk. The filter portion 105 judges whether or not a cycle T of the output signal from the acceleration detecting portion 101 is a value within a predetermined reference cycle range (the third reference cycle range) for a walk (Step S201). That is, the filter portion 105 judges whether or not the cycle T of the output signal from the acceleration detecting portion 101 falls within the third reference cycle range the data on which is stored in the allowable cycle range storing means 111 in advance. In this embodiment mode, the filter portion 105 judges whether or not the cycle T of the output signal meets a condition of 333 msec (180 rpm)<T<1,000 msec.

When the filter portion 105 judges in Step S201 that the cycle T is beyond the third reference cycle range, the filter portion 105 judges that the output signal is a noise, and outputs no signal (Step S210). When the filter portion 105 judges in Step S201 that the cycle T falls within the third reference cycle range, the filter portion 105 judges that the signal from the acceleration detecting portion 101 is the walk signal, and outputs that signal.

Next, the walk cycle comparing portion 106 compares the cycle of the signal from the filter portion 105 with the first reference cycle range based on a reference walk cycle calculated by the walk cycle calculating portion 108, thereby judging whether or not the cycle of the signal from the filter portion 105 is similar to the reference walk cycle (Step S202).

Here, the judgment reference related to whether or not the cycle of the signal from the filter portion 105 is similar to the reference walk cycle means a reference with which the frequency of occurrence of a counting error due to noises is small and the walk signal can be counted with less leakage. In this embodiment mode, Ta±10% (Ta is a moving average value of the cycles of a newest predetermined number of signals during a walk outputted from the filter portion 105) is set as the above first reference cycle range. Then, when the signal from the filter portion 105 is within the first reference cycle range, the walk cycle comparing portion 106 judges that the cycle of the signal from the filter portion 105 is similar to the reference walk cycle.

When the walk cycle comparing portion 106 judges in Step S202 that the signal from the filter portion 105 is within the first reference cycle range, the walk cycle comparing portion 106 judges that the signal from the filter 105 is the walk signal, and outputs the data on the cycles of the signal to the walk cycle calculating portion 108. The step number counting portion 107 counts the walk signal from the walk cycle comparing portion 106 and adds 1 count to the step number count value until now to output the resultant value to the display portion 103 (Step S203). The count value which is obtained by adding 1 count to the count value displayed until now is displayed as an accumulated number of steps on the display portion 103.

The walk cycle calculating portion 108 successively stores data on cycles of a predetermined number of newest signals each of which is judged to be a walk signal by the walk cycle comparing means 106 in the storage means 112, and calculates the reference walk cycle by obtaining the moving average Ta of the cycles of the predetermined number of signals data on which is stored in the storage means 112 to output the resultant moving average Ta to the walk cycle comparing portion 106.

The walk cycle comparing portion 106 executes the above processing using data on the reference walk cycle.

On the other hand, when the walk cycle comparing portion 106 judges in Step S202 that the signal from the filter portion 105 is beyond the first reference cycle range, the walk cycle comparing portion 106 outputs the signal from the filter portion 105 to the extra-regulation step number processing portion 109.

The extra-regulation step number processing portion 109 judges whether or not a cycle of a signal from the filter portion 105 is similar to a cycle of a signal data on which is stored in the extra-regulation step number temporarily holding portion 110 the last time by the walk cycle comparing portion 106, i.e., judges whether or not a cycle of a signal from the filter portion 105 is within a predetermined range (second reference cycle range) which takes the cycle of the walk signal the data of which is stored in the extra-regulation step number temporarily holding portion 110 the last time as a reference (Step S204).

When the extra-regulation step number processing portion 109 judges in Step S204 that the cycle of the signal from the filter portion 105 judged to be beyond the first reference cycle range by the extra-regulation step number portion 109 is similar to the cycle of the signal the data on which is stored in the extra-regulation step number temporarily holding portion 110 the last time, i.e., judges in Step S204 that the cycle of the signal from the filter portion 105 is within the second reference cycle range, the extra-regulation step number processing portion 109 judges that the signal from the filter portion 105 is a walk signal, and stores data on the cycle of the signal from the filter portion 105 in the extra-regulation step number temporarily holding portion 110 (Step S205). Then, the operation proceeds to Step S206. Note that the judgment in Step S204 shows that the storage contents in the extra-regulation step number temporarily holding portion 110 are empty, the operation proceeds unconditionally to Step S205.

When the extra-regulation step number processing portion 109 judges in Step S204 that the cycle of the signal from the filter portion 105 judged to be beyond the first reference cycle range by the extra-regulation step number processing portion 109 is not similar to the cycle of the signal the data on which is stored in the extra-regulation step number temporarily holding portion 110 the last time, i.e., judges in Step S204 that the cycle of the signal from the filter portion 105 is beyond the second reference cycle range, the extra-regulation step number processing portion 109 judges that the signal from the filter portion 105 is not a walk signal, and clears all the storage contents in the extra-regulation step number temporarily holding portion 110 (Step S209).

Next, the extra-regulation step number processing portion 109 judges whether or not the signals outputted from the filter portion 105 through the step cycle comparing portion 106 are signals each within the second reference cycle range and are continuously outputted from the filter portion 105 by the predetermined number of times (four times in this embodiment mode) (Step S206). When the extra-regulation step number processing portion 109 judges that the signals are continuously outputted from the filter portion 105 by the predetermined number of times, the extra-regulation step number processing portion 109 judges that after a cycle of a walk of a user changes, the cycle in the walk of the user becomes stable. Then, the extra-regulation step number processing portion 109 outputs the predetermined number of signals as the predetermined number of steps to the step number counting portion 107, and outputs the data on the cycles of the predetermined number of signals stored in the extra-regulation step number temporarily holding portion 110 to the walk cycle calculating portion 108 (Step S207). The step number counting portion 107 counts the number of steps as the predetermined number of steps, and data on the accumulated number of steps is displayed on the display portion 103.

When the walk cycle calculating portion 108 receives the data on the cycles of the predetermined number of signals stored in the extra-regulation step number temporarily holding portion 110 from the extra-regulation step number temporarily holding portion 110, the walk cycle calculating portion 108 rewrites the storage contents within the storage means 112 to data on the cycles of the predetermined number of signals received from the extra-regulation step number temporarily holding portion 110 to store the resultant data in the storage means 112, and newly calculates the moving average Ta of a walk cycle using the data of the cycles of the predetermined number of signals thus stored (Step S208) to output the resultant moving average Ta to the walk cycle comparing portion 106. The walk cycle comparing portion 106 calculates a first reference cycle range using the moving average Ta of the walk cycles, and executes the above processing based on the resultant first reference cycle range.

When the extra-regulation step number processing portion 109 judges in Step S206 that the signals outputted from the filter portion 105 through the walk cycle comparing portion 106 are signals each within the second reference cycle range and are not continuously outputted from the filter portion 105 by the predetermined number of times, the processings are completed.

By repeating the above operation, the counting portion 102 executes the processing for counting the number of steps based on the walk signal detected by the acceleration detecting portion, and data on the accumulated number of steps is displayed on the display portion 103 at any time.

When the user intends to complete the step number measurement, the user can stop the counting operation in the counting portion 102 by manipulating the switch 104. In addition, the displayed contents on the display portion 103 can also be reset by manipulating the switch 104.

As described above, the electronic pedometer according to this embodiment mode having: the acceleration detecting portion 101 having the walk sensor 100 for outputting a walk signal corresponding to a walk of a user detected by the walk sensor 100; and the counting portion 102 for counting the number of steps based on the walk signal from the acceleration detecting portion 101, the walk sensor 100 being used at least by being mounted on the body of the user is characterized in that the counting portion 102 counts each signal within a first reference cycle range of the signals from the acceleration detecting portion 101 as one step, and counts as the predetermined number of steps the predetermined number of signals in the case where signals within a second reference cycle range, among the signals each beyond the first reference cycle range are continuously outputted.

Consequently, even when the detection signal is mixed with a noise caused by a factor other than a walk, or the walk cycle changes, a change in walk cycle can be discriminated to detect the number of steps. Hence, it becomes possible to enhance the precision in measurement of the number of steps.

The present invention can also be applied to an electronic pedometer which is configured such that all constituent elements of the pedometer are mounted on a user for use, or to an electronic pedometer which is configured such that: a part (including at least sensors) of constituent elements is mounted on a user; other constituent elements transmit/receive signals in a wireless manner to/from the part of the constituent elements; and the other constituent elements are provided in a place distant from the user. In addition, the present invention can also be applied to an electronic pedometer in which the walk sensor is mounted on a part of the body other than an arm.

According to the present invention, even when a detection signal is mixed with a noise caused by a factor other than a walk, or a walk cycle changes, it becomes possible to enhance precision in measurement of the number of steps.

What is claimed is:

1. An electronic pedometer comprising:
walk detecting means having a walk sensor mountable on a user's body for outputting a walk signal corresponding to a walk of a user detected by the walk sensor; and
counting means for counting the number of steps based on the walk signal from the walk detecting means by counting each signal within a first reference cycle range of signals from the walk detecting means as the number of steps for one step, and counting a predetermined number of signals as a predetermined number of steps when the predetermined number of signals each within a second reference cycle range of the signals each beyond the first reference cycle range are continuously outputted from the walk detecting means, the counting means comprising first cycle judging means for judging whether or not each signal from the walk detecting means is a signal within the first reference cycle range, second cycle judging means for judging whether or not each signal judged to be beyond the first reference cycle by the first cycle judging means among the signals from the walk detecting means is a signal within the second reference cycle range, and step number counting means for counting each signal judged to be a signal within the first reference cycle range by the first reference cycle judging means among the signals from the walk detecting means as the number of steps for one step, and for, when the second reference cycle judging means judges that a predetermined number of signals each within the second reference cycle range are continuously outputted from the walk detecting means, counting the predetermined number of signals thus continuously outputted as the predetermined number of steps.

2. An electronic pedometer according to claim 1; wherein the second cycle judging means includes first cycle storing means for successively storing data on cycles of the predetermined number of signals each judged to be a signal within the second reference cycle range; wherein when the signal judged to be beyond the first reference cycle range by the first cycle judging means is a signal within a predetermined cycle range with a cycle of a newest signal data on which is stored in the first cycle storing means as a reference, the second cycle judging means judges that the signal thus judged is a signal within the second reference cycle range and stores the signal thus judged in the first cycle storing means; wherein when the first cycle storing means stores therein data on the cycles of the predetermined number of signals, the predetermined number of signals are outputted as the predetermined number of steps; and wherein the counting means counts the predetermined number of steps.

3. An electronic pedometer according to claim 2; wherein the counting means comprises reference cycle calculating means for movement-averaging cycles of a predetermined number of newest signals each judged to be within the first reference cycle range by the first cycle judging means among signals from the walk detecting means; and wherein the first cycle judging means judges whether or not a signal from the walk detecting means is a signal within the first reference cycle range using as the first reference cycle range a predetermined range having as a reference the moving average calculated by the reference cycle calculating means.

4. An electronic pedometer according to claim 3; wherein the reference cycle calculating means includes second cycle storing means for successively storing therein data on cycles of a predetermined number of newest signals each judged to be within the first reference cycle range by the first cycle judging means; and wherein the reference cycle calculating means obtains a moving average of the cycles of the predetermined number of signals using the data stored in the second cycle storing means.

5. An electronic pedometer according to claim 4; wherein when the reference cycle calculating means receives data on the cycles of the predetermined number of signals from the first cycle storing means, the reference cycle calculating means stores the data on the cycles of the predetermined number of signals in the second cycle storing means and obtains a moving average using the cycles of the signals stored in the second cycle storing means.

6. An electronic pedometer according to claim 1; wherein the walk sensor is used by being mounted on an arm of a the user.

7. An electronic pedometer according to claim 6; wherein the counting means performs a timing function.

8. An electronic pedometer according to claim 1; further comprising a display portion for displaying data corresponding to the number of steps counted by the counting means.

9. An electronic pedometer according to claim 8; wherein the display portion comprises a liquid crystal display device.

10. An electronic pedometer according to claim 8; further comprising means for starting a counting operation of the counting means, stopping the counting operation, and resetting a count value of the counting operation.

11. An electronic pedometer comprising:
a walk sensor that detects a walk of a user;
an acceleration detection portion that outputs a walk signal corresponding to a walk of the user detected by the walk sensor; and
a counting portion that counts the number of steps of the user in accordance with the walk signal from the acceleration detection portion, the counting portion comprising a filter portion that outputs a signal having a cycle within an allowable change range among signals outputted from the acceleration detecting portion, a walk cycle calculating portion that calculates a reference walk cycle, a walk cycle comparing portion that compares a cycle of a signal from the filter portion with a first reference cycle range in accordance with the reference walk cycle to output a signal having a cycle within the first reference cycle range among signals outputted from the filter portion as the number of steps for one step and to output a signal beyond the first reference cycle range among signals from the filter portion, an extraregulation step number temporarily holding portion that stores cycles of signal data, an extraregulation step number processing portion that compares a cycle of a signal from the walk cycle comparing portion with a second reference cycle range corresponding to a cycle of a newest signal among the cycles of signal data stored in an extra-regulation step number temporarily holding portion to store a signal having a cycle within the second reference cycle range among the signals from the walk cycle comparing portion and that outputs the data of the number of cycles of signals stored in the extra-regulation step number temporarily holding portion and resets and erases the signal data stored in the extra-regulation step number temporarily holding portion when the number of cycles of signal data stored in the extra-regulation step number temporarily holding portion becomes a predetermined number, and a step number counting portion for counting the current number of steps by adding the number of steps obtained from the walk cycle comparing portion and the extraregulation step number processing portion to a step number count value.

12. An electronic pedometer according to claim 11; wherein the walk sensor is mountable on the user's body.

13. An electronic pedometer according to claim 11; wherein the walk sensor is used by being mounted on an arm of the user.

14. An electronic pedometer according to claim 11; wherein the counting portion performs a timing function.

15. An electronic pedometer according to claim 11; further comprising a display portion for displaying data corresponding to the number of steps counted by the counting portion.

16. An electronic pedometer according to claim 15; wherein the display portion comprises a liquid crystal display device.

17. An electronic pedometer according to claim 11; further comprising a switch that is adapted for manipulation to start a counting operation of the counting portion, stop the counting operation, and reset a count value of the counting operation.

18. An electronic pedometer according to claim 11; wherein the walk sensor is mountable on the user's body; and wherein at least one of the acceleration detection portion and the counting portion is not mountable on the user's body and communicates with the walk sensor by wireless communication.

* * * * *